Dec. 20, 1927.
W. G. MAYER
1,653,580
SHOCK ABSORBING MEANS
Filed Jan. 27, 1922
2 Sheets-Sheet 1
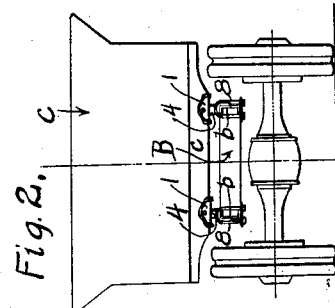
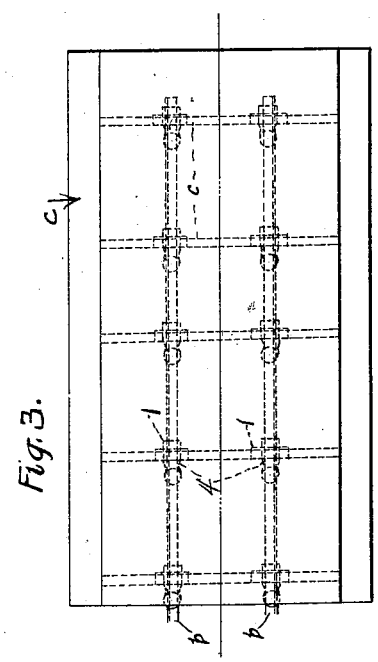
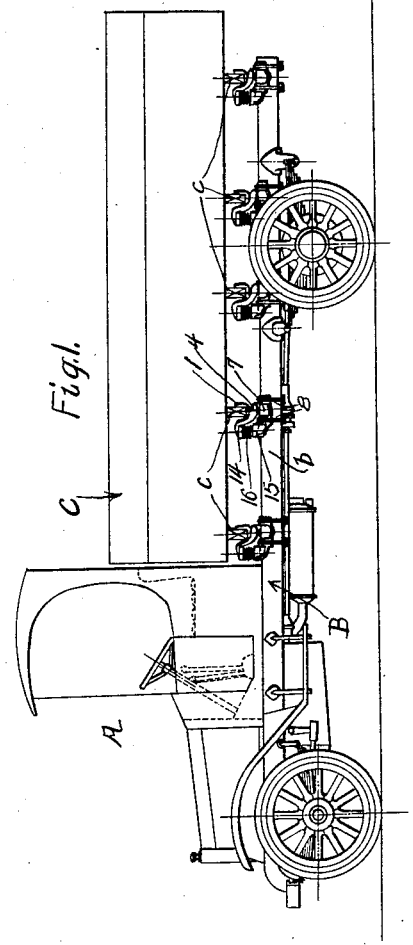
W. G. Mayer
INVENTOR
BY Victor J. Evans
ATTORNEY Dec. 20, 1927.
W. G. MAYER
1,653,580
SHOCK ABSORBING MEANS
Filed Jan. 27, 1922
2 Sheets-Sheet 2
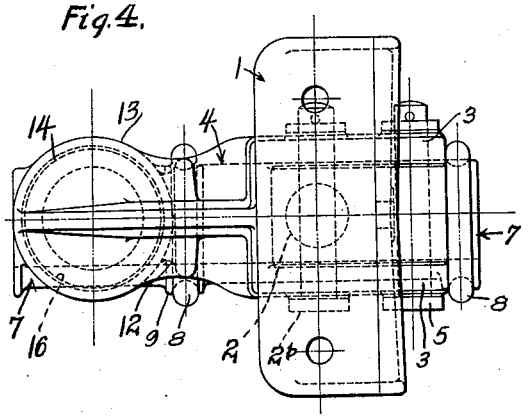
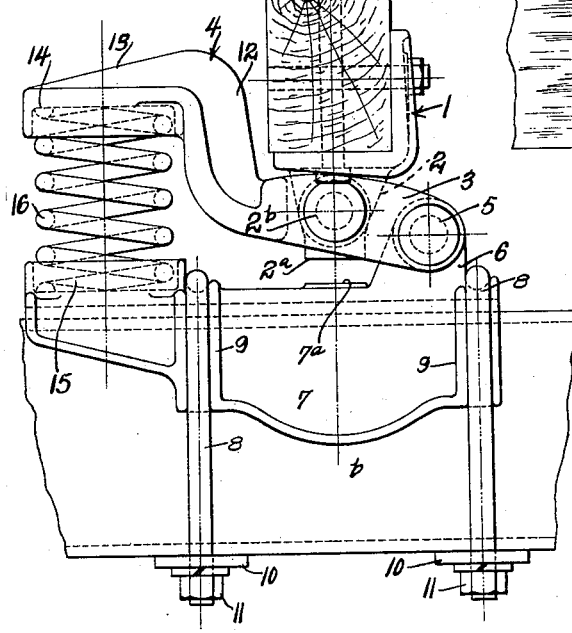
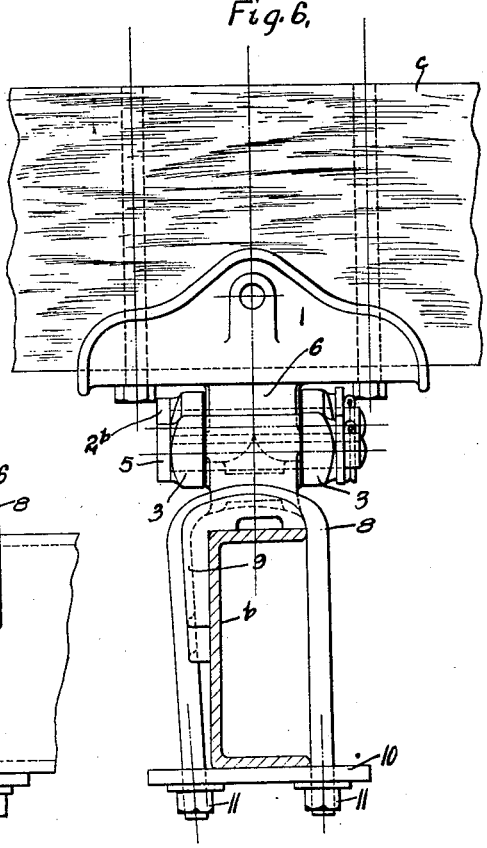
W. G. Mayer,
INVENTOR
BY Victor J. Evans
ATTORNEY Patented Dec. 20, 1927.

1,653,580

UNITED STATES PATENT OFFICE.

WILLIAM G. MAYER, OF PITTSBURGH, PENNSYLVANIA.

SHOCK-ABSORBING MEANS.

Application filed January 27, 1922. Serial No. 532,314.

This invention relates to shock absorbing means, and more particularly to a mounting for a truck body.

One of the main objects of the invention is to provide simple and efficient means for resiliently supporting the body of a truck so as to prevent racking of the truck body, the resilient supporting means acting to absorb shocks thus materially lengthening the life of the truck body. A further object is to provide means of the character stated of simple construction and operation which may be readily applied to a truck body and chassis of standard construction. Another object is to provide means of the character stated capable of supporting great weight. Further objects will appear from the detailed description.

In the drawings:—

Figure 1 is a side view of the supporting means applied;

Figure 2 is a back view;

Figure 3 is a top plan view of the body, the supporting means being indicated by dotted lines;

Figure 4 is a top plan view of one of the supporting members;

Figure 5 is a side view of one of the supporting members as applied;

Figure 6 is a back view of one of the supporting members as applied.

The invention is intended to be used in connection with a truck A of a known type which includes a chassis B having side rails $b$ and a body C of known construction provided with bottom cross-beams $c$. Each cross-beam $c$ is seated, adjacent to each end, in an angle plate 1 provided with a depending lug 2 pivotally supported by pin $2^b$ between fingers 3 of an arm 4 pivotally secured at one end by a bolt 5 to a block 6 which projects upwardly from the rearward end of a securing bracket 7 of angle cross-section which fit about rail or sill $b$ of the chassis. Bracket 7 is secured in position by U-bolts 8 which fit in channel elements 9 of the bracket, these bolts passing about sill $b$ and through plates 10 extending beneath the sill, securing nuts 11 being threaded on the ends of the bolts. As will be understood, the sills $b$ and beams $c$ may be of any suitable or preferred construction and bracket 7 and plate 1 may be secured in any suitable or preferred manner.

Arm 4 is provided with a forwardly and upwardly inclined neck 12 provided at its upper end with a head 13 which is disposed substantially horizontally, the underface of this head being recessed to form a cup 14 which is disposed in alignment with a cup 15 provided at the forward end of bracket 7. The cups 14 and 15 receive the ends of an expansion coil spring 16.

In practice any suitable or preferred number of the supporting devices are secured on sills $b$ and secured to cross-beams $c$ so as to support body C of the truck upon angle plates 1 and arms 4. As downward movement of arms 4 is resisted by springs 16, this provides a very efficient spring mounting for the truck body which is capable of absorbing the shocks and jars to which the truck is submitted during travel. The size and strength of the springs 16 may be varied in accordance with the load which the truck is to carry, heavy springs being used for trucks carrying heavy loads and lighter springs for lighter types of trucks, as will be understood. Downward movement of arm 4 is positively limited by a bumper $2^a$ provided at the lower end of lug 2 and positioned to strike a bumper element $7^a$ projecting from the upper face of bracket 7 adjacent to block 6. Under ordinary conditions bumper $2^a$ will not come into contact with element $7^a$, these elements only being brought into play under abnormal conditions. Rebound of arm 4 is positively limited by neck 12 which is disposed to contact with beam $c$ thus preventing upward movement of the forward end of the arm to such an extent as to permit cup 14 to be moved from over the upper end of spring 16. This insures that the spring is at all times in operative position and effectually eliminates any possibility of unseating of any of the springs used in the shock absorbing structure. The truck body C is thus supported upon the springs 16 so that all shocks are effectually absorbed by these springs thus materially lengthening the life of the body of the truck, as well as of the whole truck structure since the chassis is relieved of the continual strains and pounding which result from mounting the body directly upon the chassis as is the present practice.

As will be understood, changes in details of construction and arrangement of parts of the invention may be resorted to without departing from the field and scope of the same, and I intend to include all such variations, as fall within the scope of the appended claims, in this application in which the preferred form only of my invention is disclosed.

What I claim is:—

1. Means for cushioning truck bodies comprising a plurality of brackets adapted to symmetrically support the body, each bracket carrying a forked Z-shaped lever pivoted in lugs, a pivoted angle piece adjacent to the angular wall of the lever, said angle piece being pivoted to the lever and conforming to a part of the body, said angular wall of the Z-shaped lever lying proximate to a cross-beam of the body, cooperating integral bumper elements on the lever and bracket, and an outer circular recessed arm on the lever to nest one end of a compression spring having its other end mounted in the base of the bracket, whereby the bumpers limit downward thrust and the Z-walls limit their rebound.

2. In a device for supporting truck bodies, a bracket adapted for securement to a chassis, an arm pivotally secured at one end to the bracket and provided at its other end with an upwardly extending neck and a head extending substantially horizontally from the upper end of the neck, an angle plate pivotally secured to the arm adjacent to the pivot thereof, and a cushion member confined between said head and the bracket, the angle plate being provided with a depending stop element coacting with the bracket to positively limit downward movement of the arm.

3. In a device for supporting truck bodies, a bracket adapted for securement to a chassis, an arm pivotally secured at one end to the bracket and provided at its other end with an upwardly extending neck and a head extending substantially horizontally from the upper end of the neck, an angle plate pivotally secured to the arm adjacent to the pivot thereof, and a cushion member confined between said head and the bracket, the neck of the arm being disposed adjacent the angle plate to cooperate with a beam of a truck body to which the plate is secured to limit upward movement of the arm.

In testimony whereof I affix my signature.

WM. G. MAYER.